United States Patent
Han et al.

(10) Patent No.: US 9,360,694 B2
(45) Date of Patent: Jun. 7, 2016

(54) LIQUID CRYSTAL PANEL ASSEMBLY AND LIQUID CRYSTAL DISPLAY DEVICE INCLUDING THE SAME

(71) Applicant: SAMSUNG ELECTRONICS CO., LTD., Suwon-si (KR)

(72) Inventors: Young-ran Han, Seoul (KR);
Kyoung-oh Choi, Seoul (KR);
Hyun-mook Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 110 days.

(21) Appl. No.: 14/168,226

(22) Filed: Jan. 30, 2014

(65) Prior Publication Data

US 2014/0368751 A1    Dec. 18, 2014

(30) Foreign Application Priority Data

Jun. 18, 2013    (KR) .......................... 10-2013-0069906

(51) Int. Cl.
*G02F 1/1333* (2006.01)

(52) U.S. Cl.
CPC ...... *G02F 1/133308* (2013.01); *G02F 1/13338* (2013.01); *G02F 2001/133314* (2013.01); *G02F 2001/133325* (2013.01)

(58) Field of Classification Search
CPC ............................ G02F 1/1335; G02F 1/1333

USPC ...................................................... 349/12, 58
See application file for complete search history.

(56) References Cited

U.S. PATENT DOCUMENTS

| | | | | |
|---|---|---|---|---|
| 6,025,897 | A * | 2/2000 | Weber et al. | ..................... 349/96 |
| 2004/0130538 | A1 | 7/2004 | Lin | |
| 2004/0189887 | A1 | 9/2004 | You et al. | |
| 2012/0299865 | A1 * | 11/2012 | Yu | ................................. 345/174 |

FOREIGN PATENT DOCUMENTS

EP    2077464 A1    7/2009

OTHER PUBLICATIONS

Communication dated Sep. 24, 2014, issued by the European Patent Office in counterpart European Application No. 14152611.1.
Communication dated Dec. 14, 2015, issued by the European Patent Office in counterpart European Application No. 14152611.1.

* cited by examiner

*Primary Examiner* — Lucy Chien
(74) *Attorney, Agent, or Firm* — Sughrue Mion, PLLC

(57) ABSTRACT

A liquid crystal panel assembly is provided. The liquid crystal panel assembly includes a liquid crystal panel configured to display an image, a backlight arranged in the rear of the liquid crystal panel and configured to supply light to the liquid crystal panel, a package module configured to package the liquid crystal panel and the backlight into one module, and at least one dummy member arranged to occupy a space provided in the rear of the backlight in the package module.

20 Claims, 11 Drawing Sheets

LIQUID CRYSTAL PANEL ASSEMBLY AND LIQUID CRYSTAL DISPLAY DEVICE INCLUDING THE SAME

PRIORITY

This application claims priority from Korean Patent Application No. 10-2013-0069906, filed on Jun. 18, 2013, in the Korean Intellectual Property Office, the disclosure of which is incorporated herein by reference, in its entirety.

BACKGROUND

1. Technical Field

The exemplary embodiments relate to a liquid crystal panel assembly and a liquid crystal display device including the same.

2. Description of the Related Art

Flat panel display devices are thin, lightweight image display devices, and recently, flat panel display devices and liquid crystal display devices have become the mainstream display devices in the market.

With popularization of smart phones, liquid crystal display devices, such as televisions or monitors have appeared. They operate through a touch of a liquid crystal panel using an input device, such as a stylus pen. In this case, a liquid crystal display device is provided with a sensor board mounted therein in order to recognize an electrical input signal from an input device.

In the case where a board for performing additional functions is provided, such as the sensor board as described above, is mounted in the liquid crystal display device in the related art, it becomes necessary to change the internal structure of the liquid crystal display device or to produce a new frame of the liquid crystal display, in order to secure a space for mounting the additional board. That is, in the case of mounting an additional board in the liquid crystal display device in the related art, the liquid crystal display device is unable to be used as is, and this results in a disadvantage in time and cost.

SUMMARY

The exemplary embodiments have been made to address at least the above problems and/or disadvantages and to provide at least the advantages described below. Accordingly, an aspect of the exemplary embodiments provide a liquid crystal display device which enables an additional board for providing additional functions to be mounted therein, without any mechanical change of the liquid crystal display device.

According to an aspect of the exemplary embodiments, a liquid crystal panel assembly includes a liquid crystal panel configured to display an image; a backlight arranged in the rear of the liquid crystal panel and configured to supply light to the liquid crystal panel; a package module configured to package the liquid crystal panel and the backlight into one module; and at least one dummy member arranged to occupy a space provided in the rear of the backlight in the package module.

The dummy member may be replaceable by a sensor board that can recognize an electrical input signal from an outside source in order to provide a touch function.

The dummy member may be mounted to be separable from the package module.

The thickness of the dummy member may correspond to the thickness of the sensor board.

The dummy member may be arranged in parallel to the liquid crystal panel.

The dummy member may be a PET film or a paper.

A plurality of dummy members may be provided, and the respective dummy members may be laminated upward and downward.

The package module may include a front chassis having an opening formed thereon to output an image from the liquid crystal panel to an outside; and a rear chassis coupled to the front chassis to form a space to accommodate the liquid crystal panel and the backlight, wherein the dummy member is mounted on an inner surface of the rear chassis.

The backlight may include at least one light source; a light guide plate arranged to face the light source; an optical sheet arranged between the liquid crystal panel and the light guide plate; and a reflective sheet arranged in the rear of the light guide plate.

The dummy member may be arranged between the reflective sheet and the inner surface of the rear chassis.

The backlight may include at least one light source; a diffusion plate arranged in front of the light source; and an optical sheet arranged between the diffusion plate and the liquid crystal panel.

The dummy member may be arranged between the light source and the inner surface of the rear chassis.

According to another aspect of the exemplary embodiments, a liquid crystal display device includes a housing; and a liquid crystal panel assembly, wherein the liquid crystal panel assembly includes a liquid crystal panel configured to display an image; a backlight arranged in the rear of the liquid crystal panel and configured to supply light to the liquid crystal panel; a package module configured to package the liquid crystal panel and the backlight into one module; and at least one dummy member arranged to occupy a space provided in the rear of the backlight in the package module.

According to the exemplary embodiments described above, in comparison with the liquid crystal display device in the related art, an additional board for additional function can be mounted in the liquid crystal display device without any mechanical change of the liquid crystal display device.

An aspect of the exemplary embodiments may provide a liquid crystal panel assembly which permits replacement of a dummy board with a sensor board, the assembly including: a liquid crystal panel; a backlight arranged at the rear of the liquid crystal panel; a package module configured to package the liquid crystal panel and the backlight into one module; and at least one dummy member arranged to occupy a space provided in the package module at the rear of the backlight, wherein the dummy member is configured to be replaceable by a sensor board.

The dummy member may be mounted to be separable from the package module and the thickness of the sensor board may correspond to the thickness of the dummy member.

The dummy member may be a PET film or may be configured as paper. A plurality of dummy members may be provided, and the respective dummy members may be laminated upward and downward.

BRIEF DESCRIPTION OF THE DRAWINGS

The above and other aspects, features and advantages of the exemplary embodiments will be more apparent from the following detailed description when taken in conjunction with the accompanying drawings, in which.

DETAILED DESCRIPTION OF THE EXEMPLARY EMBODIMENTS

Figure 1:
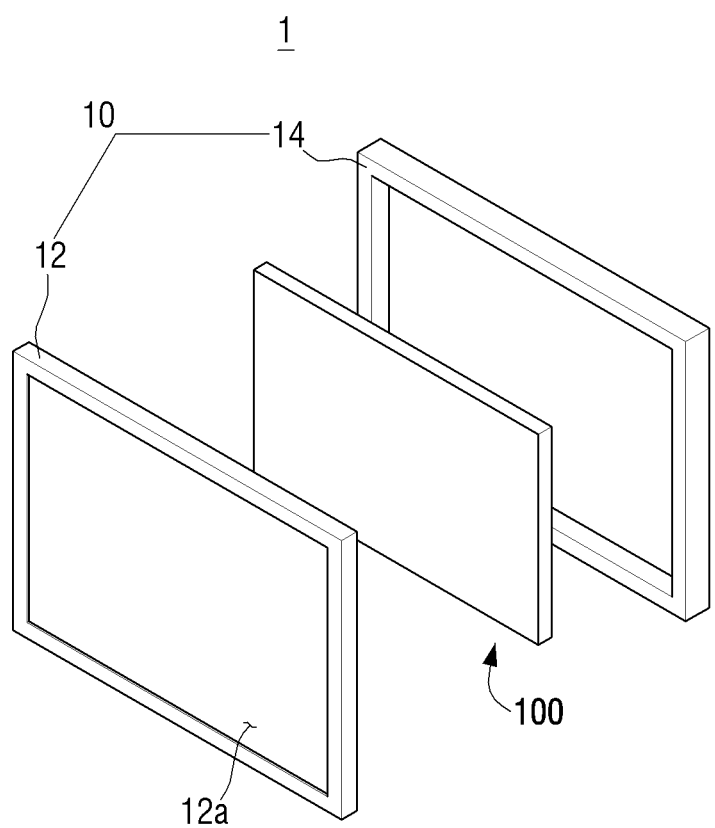
FIG. 1 is an exploded perspective view of a liquid crystal display device according to an exemplary embodiment.

Hereinafter, exemplary embodiments are described in detail with reference to the accompanying drawings. Exemplary embodiments to be described hereinafter help provide a comprehensive understanding of the present disclosure, and it should be understood that various modifications can be made, unlike the exemplary embodiments described herein. However, in the description of the exemplary embodiments, a detailed description and illustration of known functions and configurations incorporated herein will be omitted when it may make the subject matter of the present disclosure rather unclear. Further, in the drawings, dimensions of some constituent elements may be exaggerated rather than the actual reduced scales in order to help provide an understanding of the exemplary embodiments.

Figure 2:
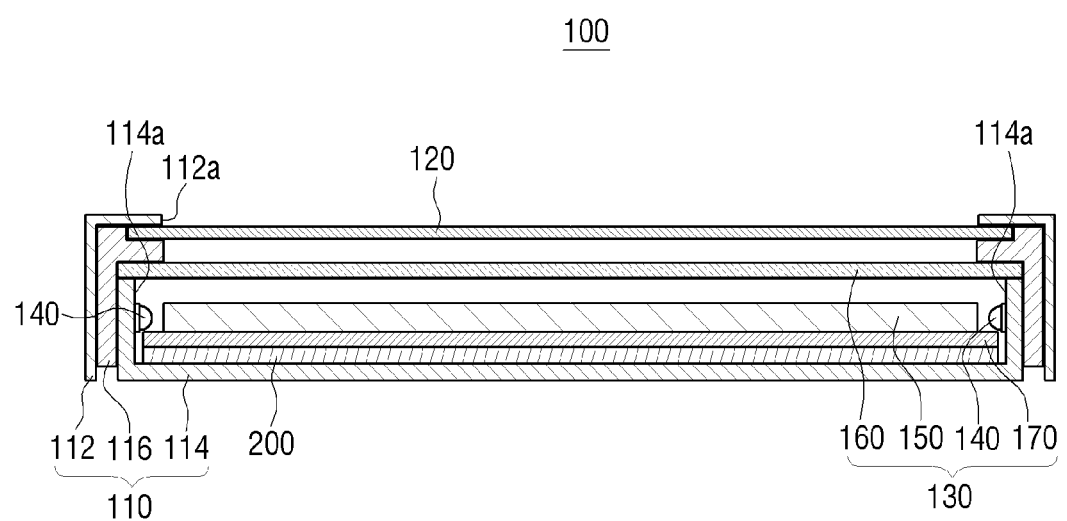
FIG. 2 is a cross-sectional view of a liquid crystal panel assembly of the liquid crystal display device of FIG. 1.
Figure 3:
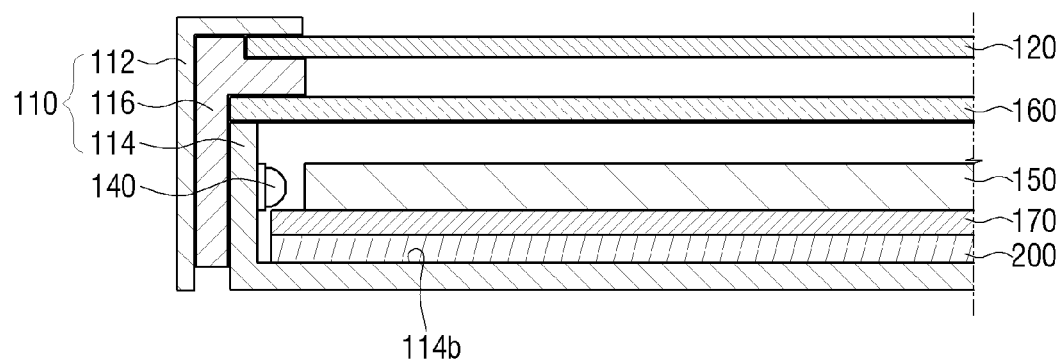
FIG. 3 is enlarged cross-sectional view of a left end region of the liquid crystal panel assembly of FIG. 2.

FIG. 1 is an exploded perspective view of a liquid crystal display device according to an exemplary embodiment, FIG. 2 is a cross-sectional view of a liquid crystal panel assembly of the liquid crystal display device of FIG. 1, and FIG. 3 is enlarged cross-sectional view of a left end region of the liquid crystal panel assembly of FIG. 2.

A liquid crystal display device 1 may be one of various types of display devices, such as a television, a monitor, a camera, and a smart phone. Hereinafter, explanation will be made based on an assumption that the liquid crystal display device 1 according to this exemplary embodiment is a television.

Referring to FIG. 1, a liquid crystal display device 1 includes a housing 10 and a liquid crystal panel assembly 100.

The housing 10 accommodates various kinds of components of the liquid crystal display device 1, such as the liquid crystal panel assembly 100, a control board (not illustrated) controlling the operation of the liquid crystal panel assembly 100, and a power board (not illustrated) supplying power to the liquid crystal panel assembly 100.

The housing 10 include a front housing 12 and a rear housing 14, which are detachably coupled to each other. The front housing 12 forms a front border of the liquid crystal display device 1, and a rectangular front opening 12a is formed on the front housing 12 to expose an image to the outside of the housing. The rear housing 14 has an accommodation space provided on an inner side thereof in order to accommodate the various components therein.

Referring to FIGS. 2 and 3, the liquid crystal panel assembly 100 includes a package module 110, a liquid crystal panel 120, a backlight 130, and a dummy member 200.

The package module 110 packages the liquid crystal panel 120 and the backlight 130 into one module, and includes a front chassis 112, a rear chassis 114, and an intermediate chassis 116.

The front chassis 112 and the rear chassis 114 are coupled to each other through the medium of the intermediate chassis 116 to form a space for accommodating the various kinds of components of the liquid crystal panel assembly 100. On the front chassis 112, an opening 112a to the outside is provided for outputting an image from the liquid crystal panel 120.

The intermediate chassis 116 supports some components of the liquid crystal panel assembly 100 in association with the front chassis 112 and the rear chassis 114. For this, the intermediate chassis 116 is arranged in an edge region inside the liquid crystal panel assembly 100, and is arranged between the front chassis 112 and the rear chassis 114.

The liquid crystal panel 120 displays a color image using light provided from the backlight 130. The liquid crystal panel 120 includes a color filter substrate (not illustrated) having a color filter layer and a thin film transistor substrate (not illustrated) having thin film transistors, and liquid crystals (not illustrated) are accommodated between the color filter substrate and the thin film transistor substrate. Since the liquid crystal panel 120 is a well known configuration, a detailed description thereof will be omitted.

The backlight 130 supplies light to the liquid crystal panel 120, and includes a light source 140, a light guide plate 150, an optical sheet 160 and a reflective sheet 170.

The light source 140 supplies light to the liquid crystal panel 120, and is mounted on an inner surface of the rear chassis 114. Specifically, the light source 140 is mounted on both side surfaces 114a of the rear chassis 114, and is arranged to face both side surfaces of the light guide plate 150. That is, the light source 140 according to this exemplary embodiment is arranged as an edge type of light source.

The light guide plate 150 is arranged in parallel with the liquid crystal panel 120 between the light sources 140. The light guide plate 150 converts the light emitted from the light source 140 into a surface light to provide the surface light to the liquid crystal panel 140.

The optical sheet 160 is arranged between the liquid crystal panel 120 and the light guide plate 140, and is fixed by the rear chassis 114 and the intermediate chassis 116. The optical sheet 160 includes a diffusion sheet and a prism sheet (not shown), and uniformly diffuses the light output from the light guide plate 150 to improve luminance.

The reflective sheet 170 is arranged in the rear of the light guide plate 150. The reflective sheet 170 reflects a lossy light that is emitted in the opposite direction to the liquid crystal panel 120 from the light guide plate 150, and makes the reflected light incident again to the light guide plate 150.

The dummy member 200 is mounted on an inner bottom surface 114b of the rear chassis 114 so that it can be separated from the package module 110. The dummy member 200 is arranged between the reflective sheet 170 and an inner surface 114b of the rear chassis 114, and is arranged in parallel to the liquid crystal panel 120.

Figure 4:
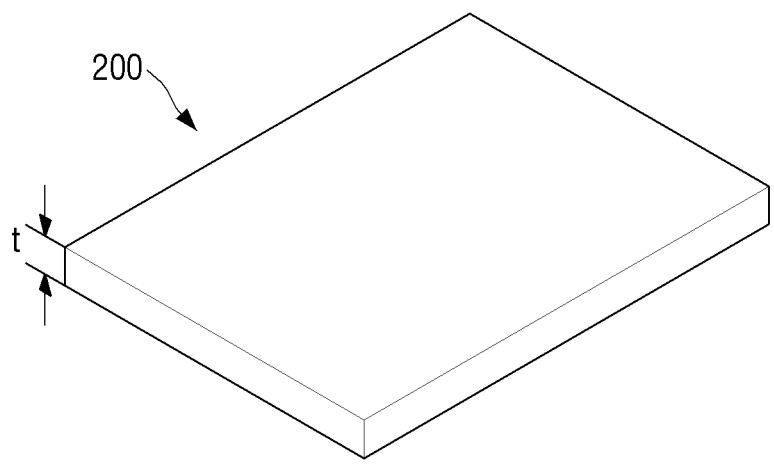
FIG. 4 is a perspective view of a dummy member of the liquid crystal panel assembly of FIG. 2.
Figure 5:
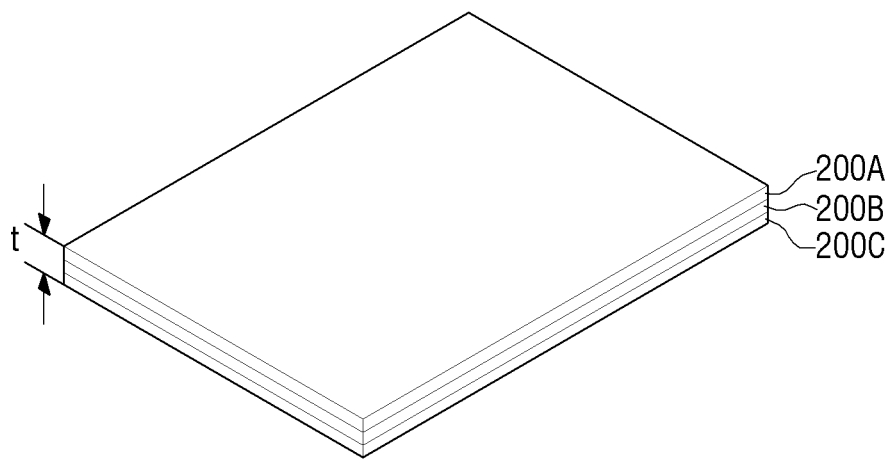
FIG. 5 is a perspective view of a dummy member of the liquid crystal panel assembly of FIG. 2 according to another exemplary embodiment.

FIG. 4 is a perspective view of a dummy member of the liquid crystal panel assembly of FIG. 2, and FIG. 5 is a perspective view of a dummy member of the liquid crystal panel assembly of FIG. 2 according to another exemplary embodiment.

Referring to FIG. 4, the dummy member 200 is in the form of a rectangular plate having a predetermined thickness t. However, this is merely exemplary, and the dummy member 200 may have any other shape having the predetermined thickness t. The thickness t of the dummy member 200 corresponds to the thickness t' (see FIG. 7) of a sensor board 300 (see FIG. 7), to be described later. In addition, it is preferable that the dummy member 200 be formed to correspond to the shape of the sensor board 300, to be described later.

The dummy member 200 may be made of a PET film. In this case, unlike other optical sheets, the dummy member 200 does not require any optical function. That is, an inexpensive PET film of the related art may be used as the dummy member 200. However, this is merely exemplary, and the dummy member 200 may be made of paper or any other material that does not cause heat generation or experience deformation problems.

Referring to FIG. 5, a plurality of dummy members 200A, 200B, and 200C may be provided. The plurality of dummy members 200A, 200B, and 200C are laminated upward and downward and are mounted on the liquid crystal panel assembly 100. Here, the total thickness t (see FIG. 7) of the plurality of dummy members 200A, 200B, and 200C corresponds to the thickness t' (see FIG. 7) of the sensor board 300 (see FIG. 7) according to the above-described exemplary embodiment. It is also possible that the dummy members 200A, 200B, and 200C are laminated and mounted in the liquid crystal panel assembly 100 with a necessary thickness t.

Figure 6:
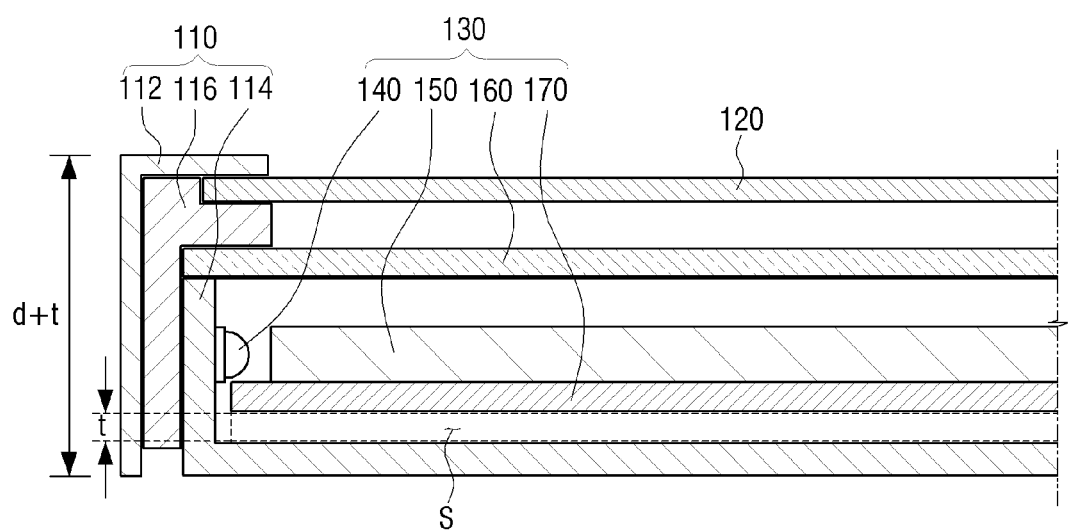
FIG. 6 is a view which illustrates the shape of the liquid crystal panel assembly of FIG. 3, excluding a dummy member.

FIG. 6 is a view which illustrates the shape of the liquid crystal panel assembly of FIG. 3, excluding a dummy member.

Referring to FIG. 6, in the liquid crystal panel assembly 100, a space S, which is provided in the rear of the backlight 130 to the extent of the thickness t of the dummy member 200 among the total thickness d+t of the liquid crystal panel assembly, may be secured through the dummy member 200 (see FIG. 3) in the package module 110.

Figure 7:
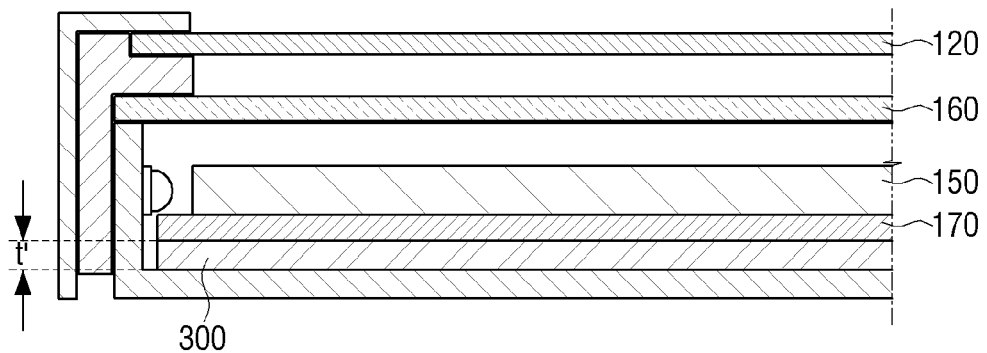
FIG. 7 is a view which illustrates the shape of the liquid crystal panel assembly of FIG. 3 having a sensor board mounted therein.

FIG. 7 is a view which illustrates the shape of the liquid crystal panel assembly of FIG. 3 having a sensor board mounted therein.

Referring to FIG. 7, the sensor board 300 may additionally be mounted in the liquid crystal panel assembly 100 to provide a touch input function. The sensor board 300 is configured to recognize the electrical input signal from an input device (not illustrated), such as a stylus pen, when the liquid crystal panel 120 is touched by the input device (not illustrated). That is, for a touch input function of the liquid crystal panel assembly 100, it is essentially required that the sensor board 300 be mounted.

In the case of mounting such a sensor board 300, the dummy member 200 (see FIG. 3) is replaced by the sensor board 300. That is, the sensor board 300 is arranged in the space S (see FIG. 6) that is occupied by the dummy member 200 in replacement of the dummy member 200.

The liquid crystal panel assembly 100 according to this exemplary embodiment can secure in advance the space S in which the sensor board 300 is mounted through the space for the dummy member 200, and thus the existing liquid crystal panel assembly 100 can be used even when the sensor board 300 is additionally provided.

Accordingly, there is no requirement to change the internal structure of the liquid crystal panel assembly 100 or to newly produce the package module 110 of the liquid crystal panel assembly 100, in order to secure a space for mounting the sensor board 300 therein, and thus the time and cost of securing the space can be saved.

As described above, it is exemplified that the sensor board 300 for the touch function is added. However, any other additional board for other additional functions other than the sensor board 300 may be mounted in replacement of the dummy member 200, in the same manner as the sensor board 300 is mounted.

Figure 8:
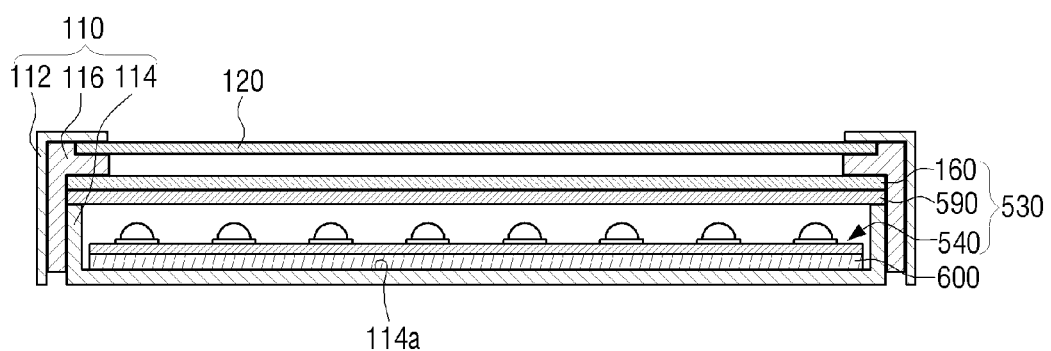
FIG. 8 is a cross-sectional view of a liquid crystal panel assembly according to another exemplary embodiment.
Figure 9:
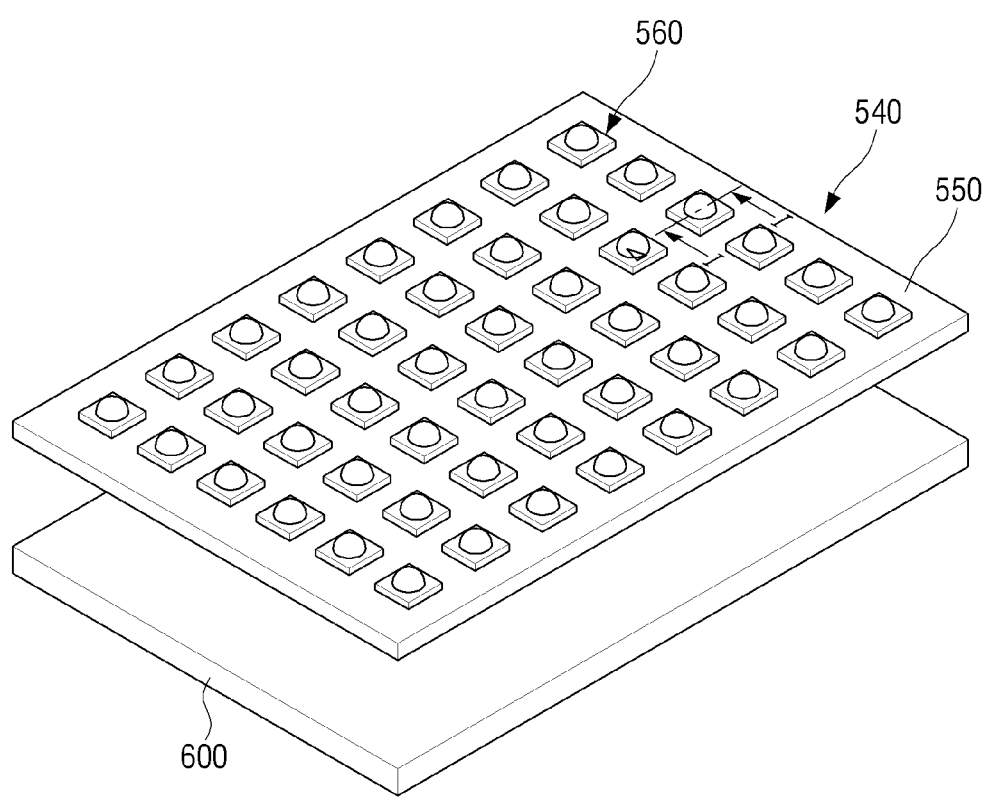
FIG. 9 is a perspective view illustrating a light source and a dummy member in the liquid crystal panel assembly of FIG. 8.
Figure 10:
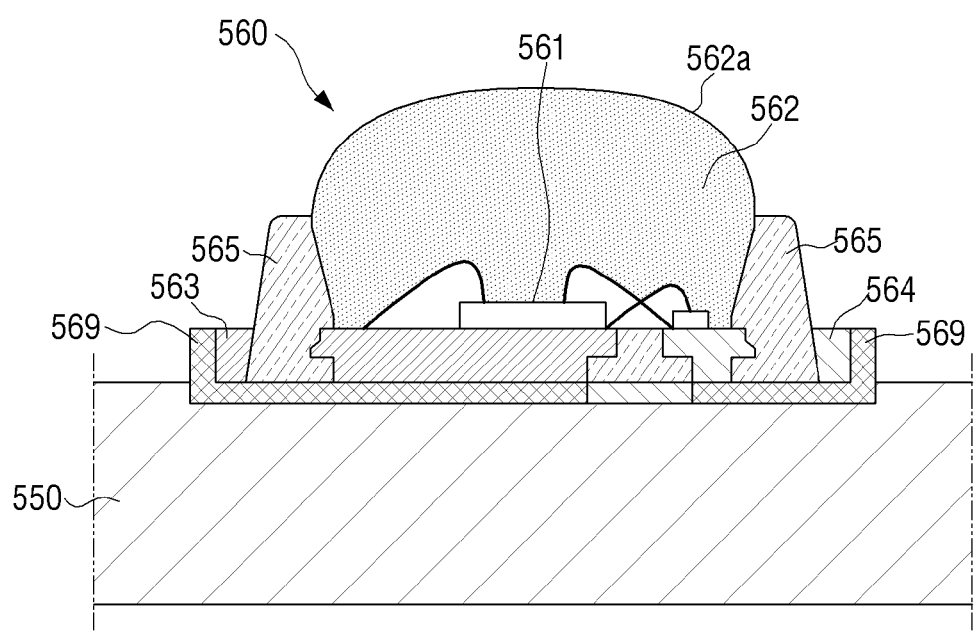
FIG. 10 is a cross-sectional view taken along line I-I of FIG. 9.
Figure 11:
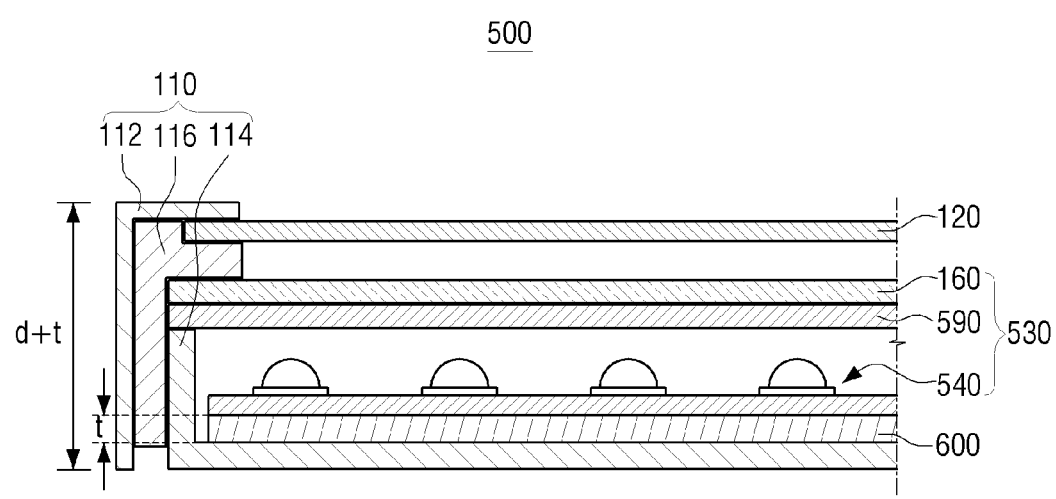
FIG. 11 is an enlarged cross-sectional view of a left end region of the liquid crystal panel assembly of FIG. 7.

FIG. 8 is a cross-sectional view of a liquid crystal panel assembly according to another exemplary embodiment. FIG. 9 is a perspective view which illustrates an optical unit and a dummy member in the liquid crystal panel assembly of FIG. 8, and FIG. 10 is a cross-sectional view taken along line I-I of FIG. 9. FIG. 11 is an enlarged cross-sectional view of a left end region of the liquid crystal panel assembly of FIG. 7.

Referring to FIG. 8, the liquid crystal panel assembly 500 includes a package module 110, a liquid crystal panel 120, and a backlight 530.

Since the package module 110 and the liquid crystal panel 120 are the same as those according to the above-described exemplary embodiment, the same reference numerals are given thereto, and the description thereof will be omitted.

The backlight 530 includes a light source 540, printed circuit board 550, and an optical sheet 160. Since the optical sheet 160 is the same as that according to the above-described exemplary embodiment, the same reference numeral is given thereto, and the description thereof will be omitted.

The light source 540 is arranged in parallel with the liquid crystal panel 120 in the rear of the liquid crystal panel 120. That is, in this exemplary embodiment, the light source 540 is of a direct type. Referring to FIG. 9, the light source 540 includes a printed circuit board 550 of a rectangular plate shape and a plurality of light source packages 560 mounted on the printed circuit board 550 to generate light.

The printed circuit board 550 supports the plurality of light source packages 560 packaged on an upper surface thereof, and transfers power that is supplied from a power source to the light source packages 560.

The light source packages 560 provide light toward the liquid crystal panel 120. The structure of the light source package 560 will be described with reference to FIG. 10, which is a cross-sectional view taken along line I-I in FIG. 9.

Referring to FIG. 10, the light source package 560 is mounted on the printed circuit board 550 using soldering, and includes a light emitting diode 561, a phosphor 562, a pair of electrodes 563 and 564, and a frame 565.

The light emitting diode 561 is a device that generates light as is well known. The phosphor 562 converts the light of a specific color that is generated by the light emitting diode 561 into another color (e.g., white color) that is suitable for the purpose of the light source 540. The phosphor 562 serves to widely diffuse the light through its outer surface 562a which is in the shape of a convex lens. As an alternative, an optical lens (not illustrated) that is arranged to cover the light source package 560 may replace the diffusion function of the phosphor 562. The pair of electrodes 563 and 564 are electrically connected to the light emitting diode 561 to the printed circuit board 550, and the frame 565 packages the light emitting diode 561, the phosphor 562, and the pair of electrodes 563 and 564.

Referring again to FIG. 8, the diffusion plate 590 supports the optical sheet 160, and is arranged in parallel with the liquid crystal panel 120. The diffusion plate 590 uniformly diffuses the light emitted from the plurality of light source packages 560.

As in the above-described exemplary embodiment, the dummy member 600 is mounted on the inner bottom surface 114b of the rear chassis 114 so that it can be separated from the package module 110. The dummy member 200 is arranged between the light source 540 and the inner surface 114b of the rear chassis 114, and is arranged in parallel to the liquid crystal panel 120. Through this, the dummy member 600 supports the printed circuit board 550 of the light source 540 in the case where the dummy member 600 is mounted on the package module 110, as illustrated in FIG. 9.

Referring to FIG. 11, the liquid crystal panel assembly 500 according to this exemplary embodiment can secure a space, which is provided in the rear of the backlight 130 to the extent of the thickness t of the dummy member 200 among the total thickness d+t of the liquid crystal panel assembly 500 as in the above-described exemplary embodiment. That is, even in the direct type liquid crystal panel assembly 500, an additional board, such as the above-described sensor board 300 (see FIG. 7), can be mounted in a state where the existing liquid crystal panel assembly 500 is used as is.

As a result, in any case of an edge type and a direct type display, the liquid crystal display device 1 according to this exemplary embodiment can use an existing mechanical frame, as is, when the additional board, such as the sensor board, is mounted in the location where the dummy member is seated.

While the present disclosure has been shown and described with reference to certain exemplary embodiments thereof, it will be understood by those skilled in the art that various changes in form and detail may be made therein without departing from the spirit and scope of the present disclosure, as defined by the appended claims.

What is claimed is:

1. A liquid crystal panel assembly comprising:
   a liquid crystal panel configured to display an image;
   a backlight arranged at the rear of the liquid crystal panel and configured to supply light to the liquid crystal panel;
   a package module configured to package the liquid crystal panel and the backlight into one module; and
   at least one dummy member configured to be replaceable by an additional board and arranged to occupy a space provided in the package module at the rear of the backlight.

2. The liquid crystal panel assembly as claimed in claim 1, wherein the additional board comprises a sensor board configured to recognize an electrical input signal from an outside for a touch function.

3. The liquid crystal panel assembly as claimed in claim 2, wherein the dummy member is mounted to be separable from the package module.

4. The liquid crystal panel assembly as claimed in claim 1, wherein the thickness of the additional board corresponds to the thickness of the dummy member.

5. The liquid crystal panel assembly as claimed in claim 1, wherein the dummy member may be arranged in parallel with the liquid crystal panel.

6. The liquid crystal panel assembly as claimed in claim 1, wherein the dummy member comprises a PET film or is made of paper.

7. The liquid crystal panel assembly as claimed in claim 1, wherein the dummy member comprises a plurality of dummy members, and
   wherein the plurality of dummy members are stacked on one another.

8. The liquid crystal panel assembly as claimed in claim 1, wherein the package module comprises:
   a front chassis having an opening formed thereon to output an image from the liquid crystal panel to outside the liquid crystal panel assembly; and
   a rear chassis coupled to the front chassis to form a space which accommodates the liquid crystal panel and the backlight,
   wherein the dummy member is mounted on an inner surface of the rear chassis.

9. The liquid crystal panel assembly as claimed in claim 8, wherein the backlight comprises:
   at least one light source;
   a light guide plate arranged to face the light source;
   an optical sheet arranged between the liquid crystal panel and the light guide plate; and
   a reflective sheet arranged at the rear of the light guide plate.

10. The liquid crystal panel assembly as claimed in claim 9, wherein the dummy member is arranged between the reflective sheet and the inner surface of the rear chassis.

11. The liquid crystal panel assembly as claimed in claim 8, wherein the backlight comprises:
    at least one light source;
    a diffusion plate arranged in front of the light source; and
    an optical sheet arranged between the diffusion plate and the liquid crystal panel.

12. The liquid crystal panel assembly as claimed in claim 11, wherein the dummy member is arranged between the light source and the inner surface of the rear chassis.

13. A liquid crystal display device comprising:
    a housing; and
    a liquid crystal panel assembly,
    wherein the liquid crystal panel assembly comprises:
    a liquid crystal panel configured to display an image;
    a backlight arranged at the rear of the liquid crystal panel and configured to supply light to the liquid crystal panel;
    a package module configured to package the liquid crystal panel and the backlight into one module; and
    at least one dummy member configured to be replaceable by an additional board and arranged to occupy a space provided at the rear of the backlight in the package module.

14. A liquid crystal panel assembly which permits replacement of a dummy board with a sensor board, the assembly comprising:
    a liquid crystal panel;
    a backlight arranged at the rear of the liquid crystal panel;
    a package module configured to package the liquid crystal panel and the backlight into one module; and
    at least one dummy member arranged to occupy a space provided in the package module at the rear of the backlight,
    wherein the dummy member is configured to be replaceable by a sensor board.

15. The liquid crystal panel assembly as claimed in claim 14, wherein the dummy member is mounted to be separable from the package module.

16. The liquid crystal panel assembly as claimed in claim 14, wherein the thickness of the sensor board corresponds to the thickness of the dummy member.

17. The liquid crystal panel assembly as claimed in claim 14, wherein the dummy member comprises a PET film or is made of paper.

18. The liquid crystal panel assembly as claimed in claim 14, wherein the dummymember comprises a plurality of dummy members, and
    wherein the plurality of dummy members are stacked on one another.

19. The liquid crystal display device of claim 13, wherein the additional board comprises a sensor board.

20. A liquid crystal panel assembly comprising:
a liquid crystal panel configured to display an image;
a backlight arranged at the rear of the liquid crystal panel and configured to supply light to the liquid crystal panel;
a package module configured to package the liquid crystal panel and the backlight into one module; and
at least one dummy member configured to be replaceable by an additional board, a shape and a thickness of the dummy member being substantially the same as a shape and a thickness of the additional board, and
wherein the additional board comprises a sensor board.

\* \* \* \* \*